Sept. 26, 1944.                 J. D. LE FRANK                    2,358,813
                             CAN WEIGHING MACHINE
                              Filed May 7, 1941
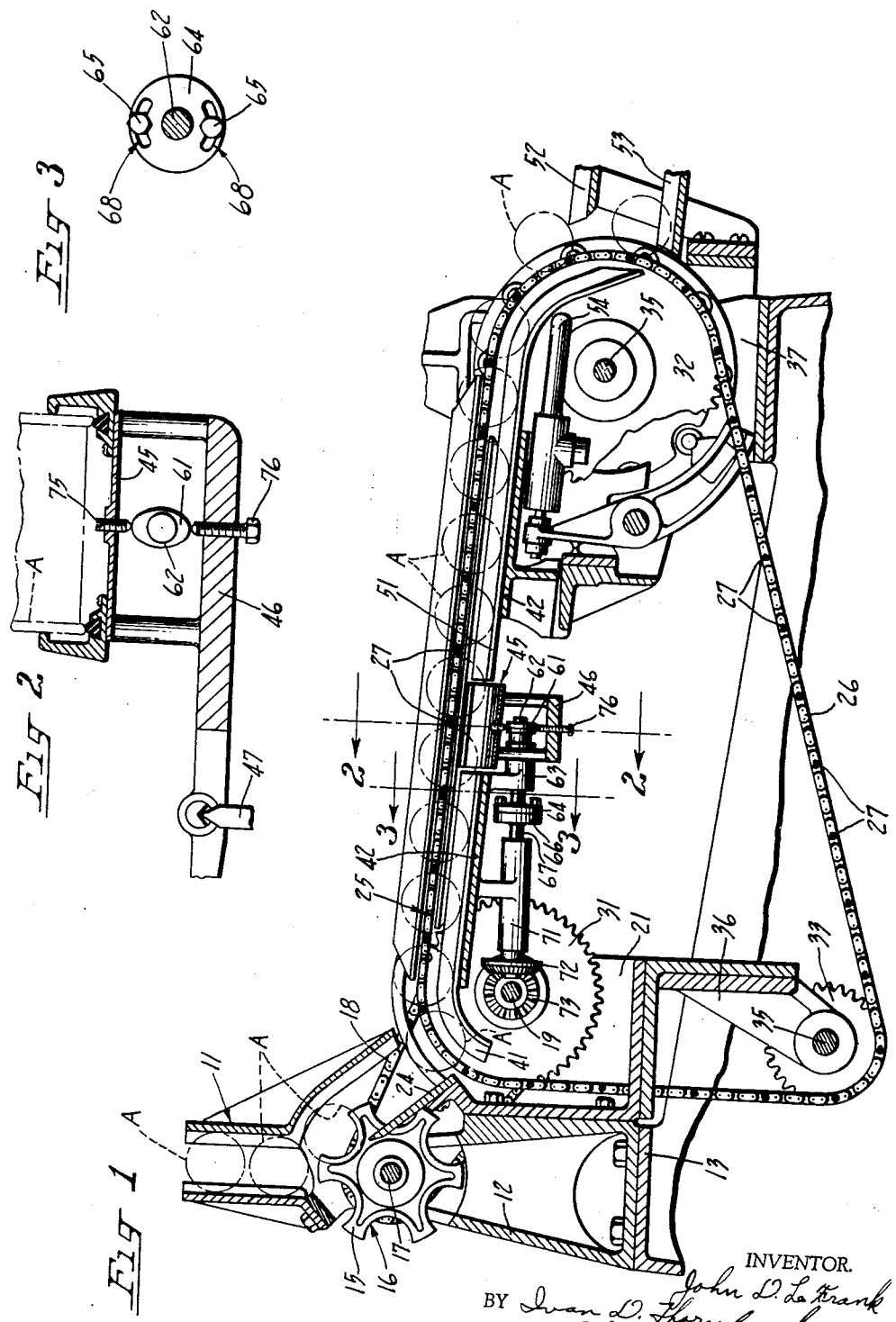
INVENTOR.
John D. LeFrank
BY Ivan D. Thornburgh
Chas. H. Erne
ATTORNEYS Patented Sept. 26, 1944

2,358,813

UNITED STATES PATENT OFFICE 2,358,813

CAN WEIGHING MACHINE

John D. Le Frank, Maplewood, N. J., assignor to American Can Company, New York, N. Y., a corporation of New Jersey Application May 7, 1941, Serial No. 392,379

3 Claims. (Cl. 265—27)

The present invention relates to a can weighing machine of the character having a floating platform on a balance beam and has particular reference to locking the platform against movement between weighing operations. This is an improvement on the weighing machine disclosed in United States Patent 2,235,725, issued March 18, 1941, to Ronald E. J. Nordquist.

Weighing machines of the character shown in the above mentioned Nordquist patent are of an especially sensitive nature. It has been found that where such machines are used in loft buildings and the like where they cannot be mounted on solid foundations, vibration of the building affects the machine and often results in inaccurate weighing.

The instant invention contemplates overcoming this difficulty by providing a locking device for the weighing platform of the machine, which device operates in synchronism with the other moving parts of the machine for resetting the platform after a weighing operation and for locking it against movement until the next weighing operation.

An object therefore of the invention is the provision in a can weighing machine of reset-locking devices which operate in synchronism with the weighing cycle to reset the weighing platform and to lock it against movement between weighing operations so that uncontrollable vibrations transmitted to the machine will be prevented from affecting the accuracy of the weighing operations.

Numerous other objects and advantages of the invention will be apparent as it is better understood from the following description, which, taken in connection with the accompanying drawing, discloses a preferred embodiment thereof.

Referring to the drawing:

Figure 1 is a longitudinal vertical section through a can weighing machine embodying the instant invention, with parts broken away; and Figs. 2 and 3 are enlarged vertical transverse sectional details taken substantially along the respective lines 2—2 and 3—3 in Fig. 1.

As a preferred embodiment of the invention the drawing illustrates principal parts of the can weighting machine disclosed in the above mentioned Nordquist patent. In such a machine cans A to be weighed enter in a horizontal position by way of a vertical entrance runway or magazine 11 which is supported on a bracket 12 bolted to a frame 13 which constitutes the main frame of the machine.

The cans A are fed from the bottom of the entrance runway 11 by a rotating feed turret 15 having pockets 16 which receive and advance the cans as the turret rotates. The turret is carried on a shaft 17 journaled in suitable bearings in the bracket 12. The shaft is rotated by a chain connection 18 with a sprocket shaft 19 journaled in bearings formed in a sub-bracket 21 which is bolted to the bracket 12.

The feed turret 15 deposits the cans one at a time into an inclined runway 24 along which the cans roll on their sides. The runway directs a can A toward a continuously moving conveyor 25 which includes a pair of spaced and endless chains 26 which are tied together by spaced transverse bars 27. These bars 27 set off pockets in the conveyor and a can A as it leaves the inclined runway 24 falls into one of these pockets.

The conveyor chains 26 operate over pairs of spaced sprockets 31, 32 which are located adjacent the opposite ends of the machine and over a pair of idler sprockets 33 which are disposed below the sprockets 31. The sprockets 31 are mounted on the shaft 19 and the remaining sprockets are mounted on shafts 35 which are journaled in suitable bearings formed in brackets 36, 37 bolted to the machine frame. One of these shafts may be the main driving shaft for actuating the conveyor 25.

When a can A is received in a conveyor pocket 24 it is propelled along a pair of spaced and parallel, downwardly inclined runway guide rails 41 which extend along the top of the machine and are secured to a table 42. Near the central portion of the machine the guide rails 41 terminate adjacent a weighing platform 45 (see also Fig. 2) carried on a balance beam 46. The beam is balanced on a knife edge support 47 which is secured to the machine frame.

The propelled can A rolls across the weighing platform 45 and is weighed and then rolls onto a second continuing pair of spaced and parallel, downwardly inclined runway guide rails 51. These guide rails terminate adjacent a pair of discharge chutes 52, 53 into which the cans are discharged by a compressed air device 54 in accordance with their weight as detected by the weighing platform. These operations are the same as those disclosed in the Nordquist patent above mentioned.

In order to prevent vibrations in the machine from affecting the delicate balance of the weighing platform and to maintain a high degree of accuracy in weighing, the platform 45 is locked against movement until a can to be weighed is fully on the platform. For this purpose there is provided a platform locking device.

This platform locking device comprises an elliptical edge cam 61 which is disposed beneath the weighing platform. The cam 61 is mounted on a short cam shaft 62 journaled in a bearing 63 which depends from the table 42. The shaft is formed with a flange 64 (see Fig. 3) which is secured by bolts 65 to a similar flange 66 on a drive shaft 67. Elongated slots 68 in the cam shaft flange 64, through which the bolts 65 extend, permit of rotary adjustment of the cam 61 relative to the drive shaft. The drive shaft 67 is journaled in a bearing 71 which depends from the table 42. This drive shaft carries a bevel gear 72 which meshes with a bevel gear 73 on the sprocket shaft 19.

Hence through the meshing bevel gears 72, 73 the drive shaft 67 is rotated in time with the conveyor 25 and thus the cam 61 rotates in time with the passage of the cans across the weighing platform. The timing is such that the cam 61 makes one half a revolution for each can to be weighed.

Between weighing operations, as when a weighed can is leaving the platform 45 and a following can to be weighed is entering upon the platform, the cam 61 is in the position illustrated in Fig. 2 in which the major axis of the cam is in a vertical position. In this position, the cam periphery along its major axis engages with two oppositely disposed adjusting screws, an upper screw 75 and a lower screw 76.

The upper screw 75 is threaded into and extends through the bottom of the weighing platform and projects down into the path of rotation of the cam. The lower screw 76 is threaded into and extends upwardly through the balance beam 46. These screws are adjusted so that the cam 61 at its major axis just fits between their inner ends. When this condition exists, the weighing platform is flush with the runway guide rails 41, 51.

Thus the cam 61 when in this position, locks the weighing platform against movement and permits the cans to enter upon and leave the platform without jarring or moving it. This locking of the platform is of only momentary duration while the cam is rotating through its cycle.

Immediately after such a locking operation and when the weighed can is entirely off the platform and a following can to be weighed is fully in place on the platform, the continued rotation of the cam brings its minor axis into vertical alignment with the setscrews 75, 76. This frees the weighing platform so that it may move either up or down to perform its weighing function. This is while the can being weighed rolls over the platform. The cam rotates through a quarter turn or ninety degrees from its locked position of Fig. 2 to bring it into this released position. This locking and unlocking action takes place for each can, one complete rotation of the shaft 62 timing in with the passage of two cans across the platform.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can weighing machine, the combination of a balance beam, a can weighing platform on said balance beam, a conveyor for propelling cans to be weighed in spaced and timed order onto and off of said platform, an elliptical cam adjacent said weighing platform, a pair of oppositely disposed adjustable setscrews respectively carried in said platform and in said balance beam and between which said cam is located, a rotatable shaft on which said cam is mounted, devices on said shaft for rotatably adjusting and locking said cam in a predetermined position, and means for rotating said cam shaft in time with said conveyor, said cam when its major axis comes into alignment with said setscrews engaging said screws and locking the platform in a stationary position between weighing operations when a can to be weighed is entering upon the platform and a weighed can is being removed therefrom, said cam when its minor axis comes into alignment with said setscrews freeing the platform for vertical movement with the balance beam to weigh a can on the platform.

2. In a can weighing machine, the combination of a balance beam, a can weighing platform on said balance beam, stationary runways leading to and away from said weighing platform, a conveyor for moving cans along said runways and onto and off of said platform, a rotatable member of non-circular cross section mounted on a fixed axis disposed beneath said weighing platform and engageable therewith, said rotatable member having a major and a minor axis thereon so that when said member is in a position with one of its said axes disposed normal to the platform said member engages and holds the platform against weighing movement in a position flush with said runways between weighing operations while a can to be weighed is entering upon the platform and a weighed can is being removed therefrom, said rotatable member in other rotative positions moving out of engagement with the platform so that the latter is free to move upwardly and downwardly with said balance beam to weigh a can on the platform, and means for rotating said member in timed relation with the movement of cans across said platform for the weighing operation.

3. In a can weighing machine, the combination of a balance beam, a can weighing platform on said balance beam, a conveyor for moving cans to be weighed onto and off of said platform, a rotatable elliptical cam having a fixed axis of rotation disposed beneath said weighing platform and engageable therewith, said elliptical cam in one position with its major axis disposed normal to the platform engaging and resetting said platform after a weighing operation while locking said platform against movement between weighing operations, said cam in other rotative positions moving out of engagement with said platform to free the latter for a subsequent can weighing operation, and means for rotating said cam in timed relation with the passage of cans across said platform for the weighing operation.

JOHN D. LE FRANK.